US009557230B2

(12) United States Patent
Akiyama

(10) Patent No.: US 9,557,230 B2
(45) Date of Patent: Jan. 31, 2017

(54) SIC HIGH TEMPERATURE PRESSURE TRANSDUCER

(71) Applicant: CSEM CENTRE SUISSE D'ELECTRONIQUE ET DE MICROTECHNIQUE SA—RECHERCHE ET DEVELOPPEMENT, Neuchatel (CH)

(72) Inventor: Terunobu Akiyama, Neuchatel (CH)

(73) Assignee: CSEM CENTRE SUISSE D'ELECTRONIQUE ET DE MICROTECHNIQUE SA—RECHERCHE ET DEVELOPPEMENT (CH)

( * ) Notice: Subject to any disclaimer, the term of this patent is extended or adjusted under 35 U.S.C. 154(b) by 72 days.

(21) Appl. No.: 14/352,737

(22) PCT Filed: Oct. 18, 2012

(86) PCT No.: PCT/IB2012/055695
§ 371 (c)(1),
(2) Date: Apr. 18, 2014

(87) PCT Pub. No.: WO2013/057689
PCT Pub. Date: Apr. 25, 2013

(65) Prior Publication Data
US 2014/0238144 A1    Aug. 28, 2014

(30) Foreign Application Priority Data

Oct. 21, 2011 (WO) ................ 2011/054713

(51) Int. Cl.
*G01L 1/18* (2006.01)
*G01L 9/00* (2006.01)
*G01L 9/06* (2006.01)

(52) U.S. Cl.
CPC .............. *G01L 1/18* (2013.01); *G01L 9/0052* (2013.01); *G01L 9/06* (2013.01)

(58) Field of Classification Search
CPC ......... G01L 9/0054; G01L 1/18; G01L 9/0055
(Continued)

(56) References Cited

U.S. PATENT DOCUMENTS 4,904,978 A * 2/1990 Barth .................... G01L 9/0055
338/4
5,184,515 A * 2/1993 Terry ........................ G01L 1/18
338/4

(Continued)

OTHER PUBLICATIONS

International Search Report prepared by the European Patent Office on Mar. 13, 2013, for International Application No. PCT/IB2012/055695.

(Continued)

*Primary Examiner* — Freddie Kirkland, III
(74) *Attorney, Agent, or Firm* — Sheridan Ross P.C.

(57) ABSTRACT

The invention concerns a pressure transducer comprising a deflecting membrane, said membrane comprising two piezoresistors (10, 11) of different types, said piezoresistors being arranged such that a same stress or a same strain is applied on said piezoresistors and said piezoresistors (10, 11) yield changes in resistance, wherein a piezoresistor of a first type (10) is positioned such that its current direction is perpendicular to the stress direction (trans verse) and a piezoresistor of a second type is parallel to the stress direction (longitudinal), allowing, when a tensile stress is applied to the transducer, said piezoresistor of the first type to increase its resistance and said piezoresistor of the second type to decrease the resistance; or when a compressive stress is applied to the transducer, said piezoresistor of the first type to decrease its resistance and said piezoresistor of the second type to increase the resistance; wherein said piezore- (Continued)

sistor of the first type (10) has a specific width and a length as short as possible and said piezoresistor (11) of the second type has a width as short as possible and a length as long as possible.

11 Claims, 3 Drawing Sheets

(58) Field of Classification Search
USPC .................................................. 73/777
See application file for complete search history.

(56) References Cited

U.S. PATENT DOCUMENTS

| | | | |
|---|---|---|---|
| 5,412,993 A * | 5/1995 | Ohtani | G01L 9/0054 73/727 |
| 5,812,047 A * | 9/1998 | van Kampen | G01L 9/0054 257/419 |
| 6,700,174 B1 | 3/2004 | Miu et al. | |
| 7,516,668 B2 * | 4/2009 | Kurtz | G01L 9/0042 73/721 |
| 7,536,919 B2 * | 5/2009 | Powlesland | G01B 7/18 73/777 |
| 7,808,365 B2 * | 10/2010 | Tojo | G01L 9/0054 338/2 |
| 2004/0173027 A1 * | 9/2004 | Katsumata | G01L 1/2281 73/754 |
| 2007/0186664 A1 | 8/2007 | Powlesland et al. | |
| 2008/0022779 A1 * | 1/2008 | Krog | G01L 9/0054 73/753 |

OTHER PUBLICATIONS

Written Opinion prepared by the European Patent Office on Mar. 13, 2013, for International Application No. PCT/IB2012/055695.

* cited by examiner

SIC HIGH TEMPERATURE PRESSURE TRANSDUCER

CROSS-REFERENCE TO RELATED APPLICATION

This application is a national stage application under 35 U.S.C. 371 and claims the benefit of PCT Application No. PCT/IB2012/055695 having an international filing date of Oct. 18, 2012, which designated the United States, which PCT application claimed the benefit of International Application No. PCT/IB2011/054713 filed Oct. 21, 2011, the disclosures of each of which are incorporated herein by reference.

FIELD OF THE INVENTION

The invention concerns a silicon carbide (SiC) high temperature pressure transducer chip (die) which does not include the package.

BACKGROUND OF THE INVENTION

SiC has three major crystal types: 3C, 4H, 6H. Since the crystal growth of SiC is technically difficult compared to that of silicon, 6H—SiC wafer was first communalized in the 1980s as a substrate for growth of GaN, which is used for blue LEDs. In the 1990s, it was demonstrated that 4H—SiC is suited for power electronic devices and the commercialization of 4H—SiC wafer has started. Today, 4H—SiC wafer is much more produced than 6H—SiC. 3C—SiC wafer is not yet commercialized.

It has been known that SiC shows piezoresistive effect. SiC has long been viewed as a potentially useful semiconductor for high temperature transducers. Several high temperature "pressure" sensors up to ~650° C. have been reported. Most of them used 6H—SiC. It is most likely because of the SiC wafer history. The following publications mentioned 4H—SiC high temperature pressure sensors:

R. S. Okojie, D. Lukco, C. Blaha, V. Nguyen, and E. Savrun, "Zero offset drift suppression in SiC pressure sensors at 600° C.," in Proc. TREE Sensors conference 2010, pp. 2269-274, 2010.

R. S. Okojie, V. Nguyen, E. Savrun, and D. Lukco, "Improved reliability of sic pressure sensors for long term high temperature applications," in Proc. Transducers '11 Beijing China, pp. 2878, 2011.

U.S. Pat. No. 7,516,668 describes a high temperature transducer fabricated from silicon carbide. It is fabricated by first epitaxially growing a layer of highly N-doped 3C silicon carbide on a first silicon wafer or substrate. A second wafer of silicon carbide, selected to be a carrier wafer, is etched preferentially to produce the deflecting diaphragms The 3C material is patterned to provide a series of individual piezoresistors which may be interconnected to form a Wheatstone bridge.

US 2004/0173027 describes a semiconductor pressure sensor which includes a semiconductor substrate having a diaphragm for receiving pressure and a bridge circuit for detecting a distortion of the diaphragm corresponding to the pressure. The bridge circuit includes a pair of first gauge resistors disposed on the center of the diaphragm and a pair of second gauge resistors disposed on a periphery of the diaphragm U.S. Pat. No. 5,184,515 describes a transducer having a plurality of sensing elements disposed in a single diaphragm wherein each of the sensing elements is spaced from every other of the sensing elements a predetermined distance so as to control interference among the sensing elements. Each of the sensing elements preferably comprises a plurality of piezoresistors each of which are coupled in a Wheatstone bridge configuration.

US 2008/0022779 discloses a pressure sensor comprising a membrane on which one first measurement element and one second measurement element for detecting a pressure impingement of the membrane are arranged on the membrane, both measurement elements are arranged distanced differently far from the edge of the membrane, and the output signals of the first and the second measurement element are evaluated together in a manner such that the two measurement elements detect a differential pressure acting on the membrane, and thereby compensate the influence of the system pressure acting on both sides of the membrane.

U.S. Pat. No. 5,812,047 discloses a piezo-resistive pressure sensor comprising one type of resistors consisting of two layers, a low-doped layer and a high doped connection layer, arranged in a radial (current flows in a direction in parallel with the radial stress) and tangential (current flows in a direction orthogonal to the radial stress) geometries and having the same length and width.

The prior art also includes the following publications: EP 1785711; US 2004/045359; U.S. Pat. Nos. 5,756,899; 5,549,006; 5,432,372; 5,191,798; 4,777,826; 5,165,283; JP 59217374; JP 56043771; U.S. Pat. No. 5,243,319; US 2008/011087; U.S. Pat. No. 4,476,726; US 2008/276726; U.S. Pat. No. 5,770,883; JP 2001272293; JP 2001304998; DE 3508610; DE 3425147; U.S. Pat. No. 3,646,435; EP 0527400; U.S. Pat. Nos. 5,081,437; 5,197,334; 4,628,296; JP 6213744; EP 1087219; U.S. Pat. Nos. 6,234,027; 4,672,411; EP 0053337; U.S. Pat. No. 4,141,253; JP 53022385; U.S. Pat. No. 6,718,830; US 2010/257938; US 2007/152679; US 2003/087481; U.S. Pat. Nos. 5,303,594; 4,766,655; JP 56040735; EP 1530028; EP 1003217; U.S. Pat. Nos. 5,677,493; 5,537,882; WO 90/01153; JP 2002039891; JP 2002039886; US 2004/183150; DE 19957556; US 2011/203381; US 2002/086460; U.S. Pat. Nos. 6,510,742; 4,788,521; 5,259,248.

In the development of a 4H—SiC high temperature pressure transducer, one could not find any useful information on "piezoresistive property" of 4H—SiC, which is necessary to design piezoresistors. Indeed, there were many publications on 6H—SiC, but not on 4H—SiC. Hence, the property of 4H—SiC were experimentally tested and quite interesting features were developed. Based on the findings, the idea as to how the 4H—SiC piezoresistors should be designed and configured for a pressure transducer was reached.

SUMMARY OF THE INVENTION

An aim of the present invention is to improve the known products and piezoresistor used for example for pressure transducers.

DETAILED DESCRIPTION OF THE INVENTION

The invention will be better understood from the following description of embodiments and from the drawings which show;

The key development of the present invention is the following: Here, we define sensitivity of a piezoresistor as $\Delta R/R = GF \times S$, where R is the resistance, GF is a gauge factor and S is an applied strain. It has been determined that the GF of n-type 4H—SiC piezoresistor depends strongly on its physical dimension, more specifically on its absolute length and width. It also depends on whether the piezoresistor is a transverse (current flow perpendicular to the direction of strain) or a longitudinal (current flow parallel to the direction of the strain) arrangement.

Figure 1:
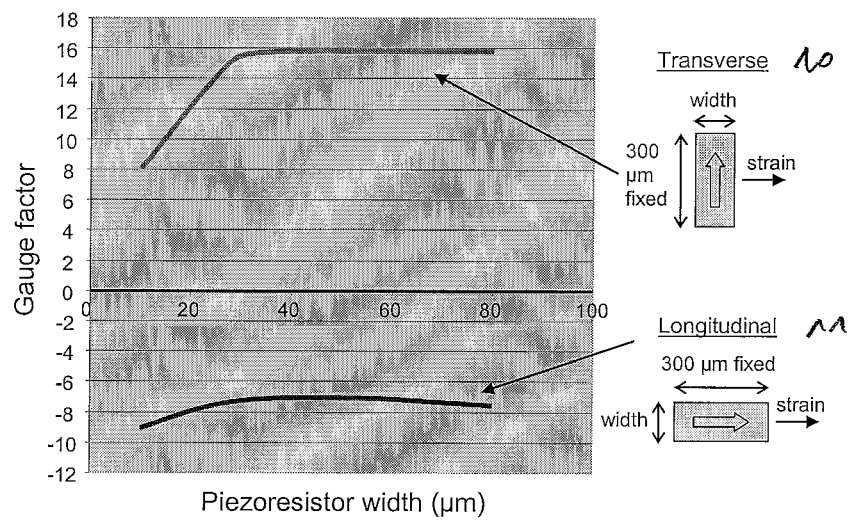
FIG. 1 illustrates the gauge factor of transverse and longitudinal piezoresistors.

FIG. 1 shows one of the findings, where both transverse and longitudinal piezoresistors have a fixed length of 300 μm and their widths are the parameters.

The transverse piezoresistor 10 has a largest GF, if the width is wider than approximately 30 μm. In contrast, the longitudinal piezoresistor 11 has a higher GF, if the width is shorter than approximately 30 μm. This tuning point, which is approximately 30 μm in the above case, can be a different value ranging from 10 μm to 50 μm depending on length of the piezoresistors and on transverse or longitudinal type. Note that the positive/negative sign of the GF means increase/decrease of resistance when a tensile stress is applied.

As an example, in order to obtain a maximum performance of sensor, one should use piezoresistors having largest GFs: e.g., transverse piezoresistor (named Piezo-A, reference 10) l=300 μm, w=80 μm and longitudinal one (named Piezo-B, reference 11) l=300 μm, w=10 μm.

Both may be made from a 1 μm-thick n-type epitaxial layer with 1.5E+19 at/cm$^3$. The resistances are $R_{Piezo-A}$=430 Ω and $R_{Piezo-B}$=3.44 kΩ. The GFs are $GF_{Piezo-A}$=16 and $GF_{Piezo-B}$=−9, respectively.

Figure 2:
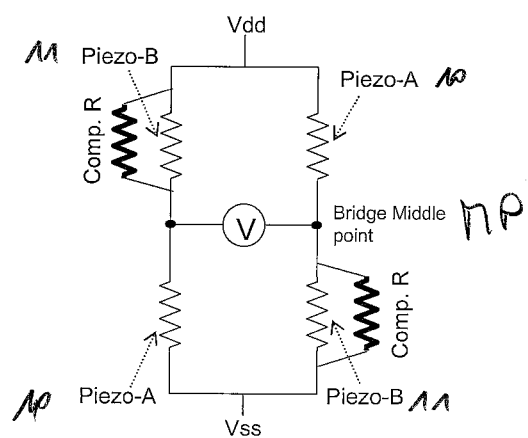
FIG. 2 illustrates an embodiment of a Wheatstone bridge.

If we configure Wheatstone bridge only with those piezoresistors as in FIG. 2, the middle point of the half bride MP has a large voltage offset from (Vdd−Vss)/2 and one has to add non-sensing resistors ("Comp. R" in FIG. 2). Consequently, the overall sensitivity of the bridge illustrated in FIG. 2 becomes slightly lower than that of a bridge comprising only sensing piezoresistors.

If one uses only one unique piezoresistor for both transverse 10 and longitudinal 11 arrangement, as disclosed in U.S. Pat. No. 5,812,047, the bridge can be well balanced, but one has to compromise to loose sensitivity: e.g., Piezo-A (l=300 μm, w=80) for both transverse and longitudinal arrangements. The longitudinal piezoresistor has now GF=−7.5 instead of GF=−9 as in the preceding example disclosed above.

Figure 3:
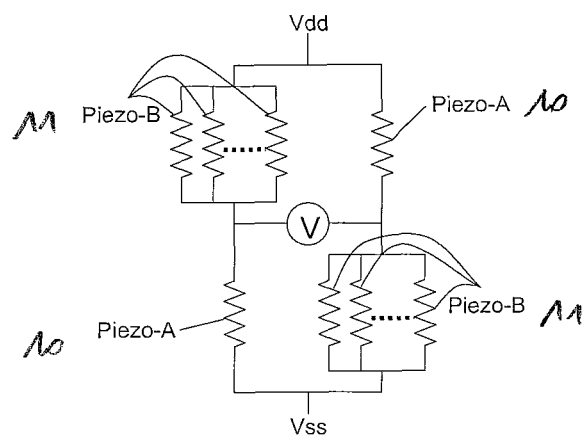
FIG. 3 illustrates an embodiment of a Wheatstone bridge according to the present invention.

One solution where one may obtain a balanced bridge without compromising to loose sensitivity is: connecting 8 pieces of Piezo-B 11 in parallel and forming a cluster having a total resistance of R=430 Ω. With this cluster, we configure Wheatstone bridge as illustrated in FIG. 3. In this case, all piezoresistors 10, 11 can still have the maximum GFs and the bridge itself can be well balanced. The GF of 4H—SiC piezoresistor depends also on other parameters, e.g., absolute dimension and aspect ratio. In brief, all phenomena which indicate that one should design Transverse Piezoresistor 10: width wider than 30 μm and as wide as possible, and length as short as possible (aspect ratio as small as possible)

Longitudinal Piezoresistor 11: width as short as possible and the length as long as possible (aspect ratio as large as possible).

Such a transverse piezoresistor 10 has a very low resistance and a longitudinal one 11 has a very high resistance. In order to use the both types in one Wheatstone bridge, one has to use the technique mentioned in the present application.

The following is the summary of an embodiment of a high temperature pressure transducer based on 4H—SiC: A pressure transducer having a deflecting membrane 12, there are two different types of piezoresistor (named Piezo-A, reference 10 and Piezo-B, reference 11) on the membrane.

The piezoresistors are arranged such that (i) same stress (compressive or tensile) or strain (positive or negative) is applied on both types and (ii) they yield different changes (increase or decrease) in resistance.

Figure 4:
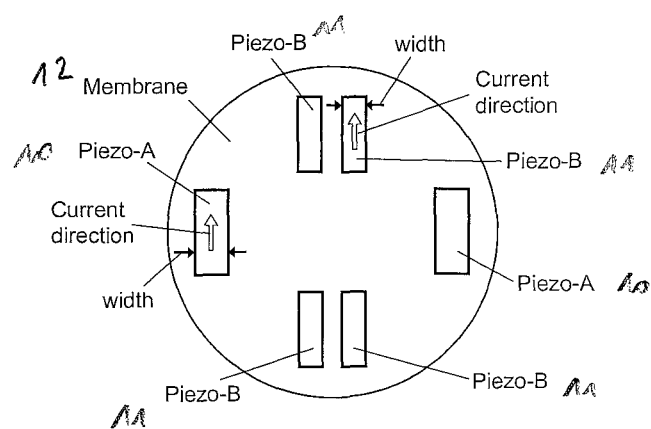
FIG. 4 illustrates an embodiment of a high temperature pressure transducer according to the present invention.

The layout can be, e.g., Piezo-A 10 is positioned such that its current direction is perpendicular to the stress direction (transverse) and Piezo-B 11 is parallel (longitudinal). This embodiment is illustrated in in FIG. 4.

When a pressure is applied to the transducer, Piezo-A 10 increases its resistance whereas Piezo-B 11 reduces the resistance.

Piezo-A 10 and Piezo-B 11 should have different "width" (physical length perpendicular to the current flow), e.g., Piezo-A 10 has w=50 μm and Piezo-B 11 has w=5 μm. At least two piezoresistors from Piezo-B 11, which has a shorter "width" than Piezo-A 10, are electrically connected in parallel and form a cluster. A Wheatstone bridge is configured on the membrane like shown in FIG. 3.

Figure 5:
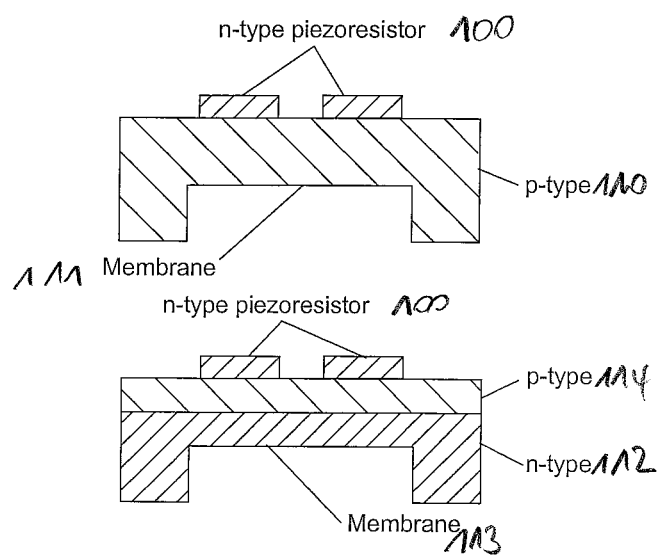
FIG. 5 illustrates shows two examples of piezoresistors according to the invention.

The n-type 4H—SiC piezoresistors 100 are either on an insulator or on a p-type SiC. FIG. 5 shows two examples:
(i) p-type SiC substrate 110 with a membrane 111 and
(ii) n-type substrate 112 with a membrane 113 on which there is a p-type SiC layer 114.

The idea could be applied to other transducers based on 6H—SiC and/or 3C—SiC.

The above description of the invention and the different embodiments are only illustrative examples and should not be construed in a limiting manner on the scope of the present invention. Many variants are possible using different equivalent means. Also, the embodiments or part thereof as described herein may be combined together as well.

The invention claimed is:

1. A pressure transducer comprising:
    a deflecting membrane, said membrane comprising at least two piezoresistors of different types, said piezoresistors being arranged such that
    (i) a same stress or a same strain, in both magnitude and sign, is applied on said piezoresistors, and
    (ii) said piezoresistors yield changes in resistance,
    wherein a piezoresistor of a first type is positioned such that its current direction is perpendicular to the stress direction and a piezoresistor of a second type is positioned such that its current direction is parallel to the stress direction, such that when a tensile stress is applied to the transducer, said piezoresistor of the first type increases its resistance and said piezoresistor of the second type decreases its resistance, or said piezoresistor of the first type decreases its resistance and said piezoresistor of the second type increases its resistance.

2. The pressure transducer according to claim 1, wherein said piezoresistor of the first type has a specific width and a length as short as possible.

3. The pressure transducer according to claim 1, wherein said piezoresistor of the second type has a width as short as possible and a length as long as possible.

4. The pressure transducer according to claim 1, wherein at least two piezoresistors of the second type are electrically connected in parallel to form a cluster and wherein said cluster and said piezoresistor of the first type are connected in a Wheatstone bridge configuration.

5. The pressure transducer according to claim 1, wherein the piezoresistor is a n-type 4H—SiC resistor.

6. The pressure transducer according to claim 1, wherein the first type of piezoresistor has a length of about 300 μm and a width of about 80 μm.

7. The pressure transducer according to claim 1, wherein the second type of piezoresistor has a length of about 300 μm and a width of about 10 μm.

8. The pressure transducer according to claim 1, wherein the first type of piezoresistor has a width of about 50 μm.

9. The pressure transducer according to claim 1, wherein the second type of piezoresistor has a width of about 5 μm.

10. The pressure transducer according to claim 1, wherein the piezoresistors of the first type or of the second type are placed on an insulator or on a p-type SiC layer.

11. The pressure transducer according to claim 1, wherein the piezoresistors of the first type or of the second type are placed on a p-type SiC layer which is on a n-type substrate.

* * * * *